United States Patent
Lin et al.

(10) Patent No.: US 7,911,752 B1
(45) Date of Patent: Mar. 22, 2011

(54) PROGRAMMING PAD ESD PROTECTION CIRCUIT

(75) Inventors: Wei-Yao Lin, Hsinchu County (TW);
Shao-Chang Huang, Hsinchu (TW);
Mao-Shu Hsu, Hsinchu (TW);
Tang-Lung Lee, Taipei County (TW);
Kun-Wei Chang, Taipei County (TW)

(73) Assignee: eMemory Technology Inc., Hsinchu Science Park, Hsin-Chu (TW)

( * ) Notice: Subject to any disclaimer, the term of this patent is extended or adjusted under 35 U.S.C. 154(b) by 27 days.

(21) Appl. No.: 12/609,006

(22) Filed: Oct. 29, 2009

(51) Int. Cl.
*H02H 9/00* (2006.01)

(52) U.S. Cl. .......................................... 361/56
(58) Field of Classification Search ............ 361/56
See application file for complete search history.

(56) References Cited

U.S. PATENT DOCUMENTS

| | | | |
|---|---|---|---|
| 4,423,431 A | 12/1983 | Sasaki | |
| 6,215,350 B1* | 4/2001 | Wyland | 327/434 |
| 6,724,592 B1* | 4/2004 | Tong et al. | 361/56 |
| 7,196,544 B2* | 3/2007 | Loughmiller | 326/38 |
| 7,755,871 B2* | 7/2010 | Ker et al. | 361/56 |
| 2006/0176076 A1* | 8/2006 | Loughmiller | 326/38 |
| 2007/0247771 A1* | 10/2007 | Chen | 361/56 |
| 2008/0316660 A1* | 12/2008 | Huang et al. | 361/56 |
| 2009/0091870 A1* | 4/2009 | Huang et al. | 361/56 |
| 2009/0135533 A1* | 5/2009 | Ker et al. | 361/56 |
| 2009/0296295 A1* | 12/2009 | Ker et al. | 361/56 |
| 2010/0123509 A1* | 5/2010 | Lin et al. | 327/436 |
| 2010/0259858 A1* | 10/2010 | Huang et al. | 361/56 |

* cited by examiner

*Primary Examiner* — Ronald W Leja
(74) *Attorney, Agent, or Firm* — Winston Hsu; Scott Margo (57) ABSTRACT

An electrostatic discharge (ESD) protection circuit is electrically connected to a core circuit for preventing ESD charges from reaching the core circuit. The ESD protection circuit includes a pad, a pass transistor, a transistor, a capacitor, a resistor, and a delay trigger unit. The pass transistor controls passage of charges from the pad to the core circuit. The transistor sinks ESD charges during an ESD zapping event. The capacitor and the resistor couple voltage at the pad to a control electrode of the transistor for turning on the transistor during the ESD zapping event. The delay trigger unit retards transmission of low voltage to a control electrode of the pass transistor for keeping the pass transistor turned off during the ESD zapping event.

10 Claims, 8 Drawing Sheets

PROGRAMMING PAD ESD PROTECTION CIRCUIT

BACKGROUND OF THE INVENTION

1. Field of the Invention

The present invention relates to electrostatic discharge (ESD) protection circuits, and more particularly to a programming pad ESD protection circuit.

2. Description of the Prior Art

Flash memory is a type of non-volatile memory commonly employed in memory cards, flash drives, and portable electronics for providing data storage and transfer. Flash memory may be electrically written to, erased, and reprogrammed to allow deletion of data and writing of new data. Some advantages of flash memory include fast read access time, and shock resistance. Flash memory is also very resistant to pressure and temperature variations.

Figure 1:
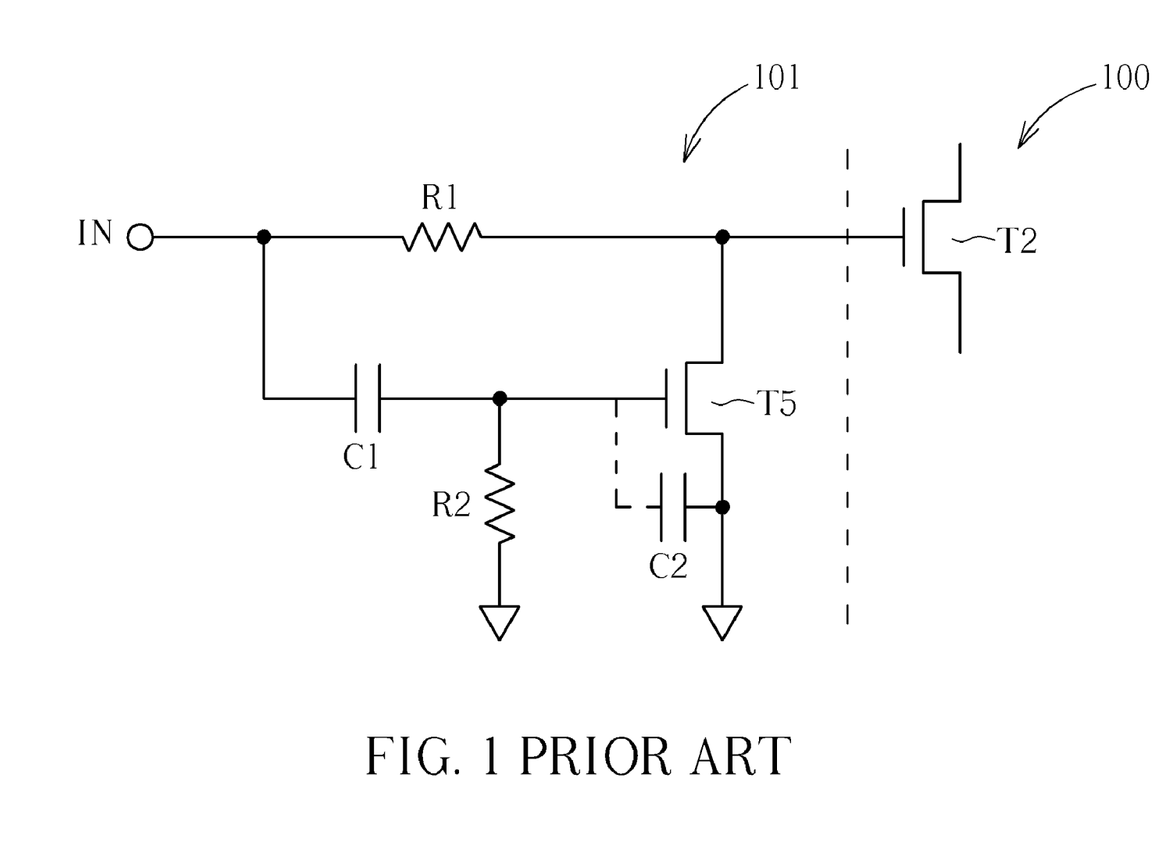
FIG. 1 is a diagram of a protection circuit and a core circuit according to the prior art.

Please refer to FIG. 1, which is a diagram of a protection circuit 101 and a core circuit 100 according to the prior art. The core circuit 101 comprises a transistor T2, and the protection circuit 101 is electrically connected to a gate electrode of the transistor T2. The protection circuit 101 comprises a transistor T5 having a drain electrode electrically connected to the gate electrode of the transistor T2, a source electrode electrically connected to ground, and a gate electrode electrically coupled to an input node IN through a capacitor C1. The drain electrode of the transistor T5 is electrically coupled to the input node IN through a resistor R1. A resistor R2 is coupled between the gate electrode of the transistor T5 and ground. A capacitor C2 is a parasitic gate-ground capacitor of the transistor T5. When a high voltage is applied to the input node IN, the capacitors C1, C2 divide the voltage, turning the transistor T5 on. Thus, voltage that would be applied to the gate electrode of the transistor T2 is sunk to ground through the transistor T5, thereby protecting the gate electrode of the transistor T2.

Figure 2:
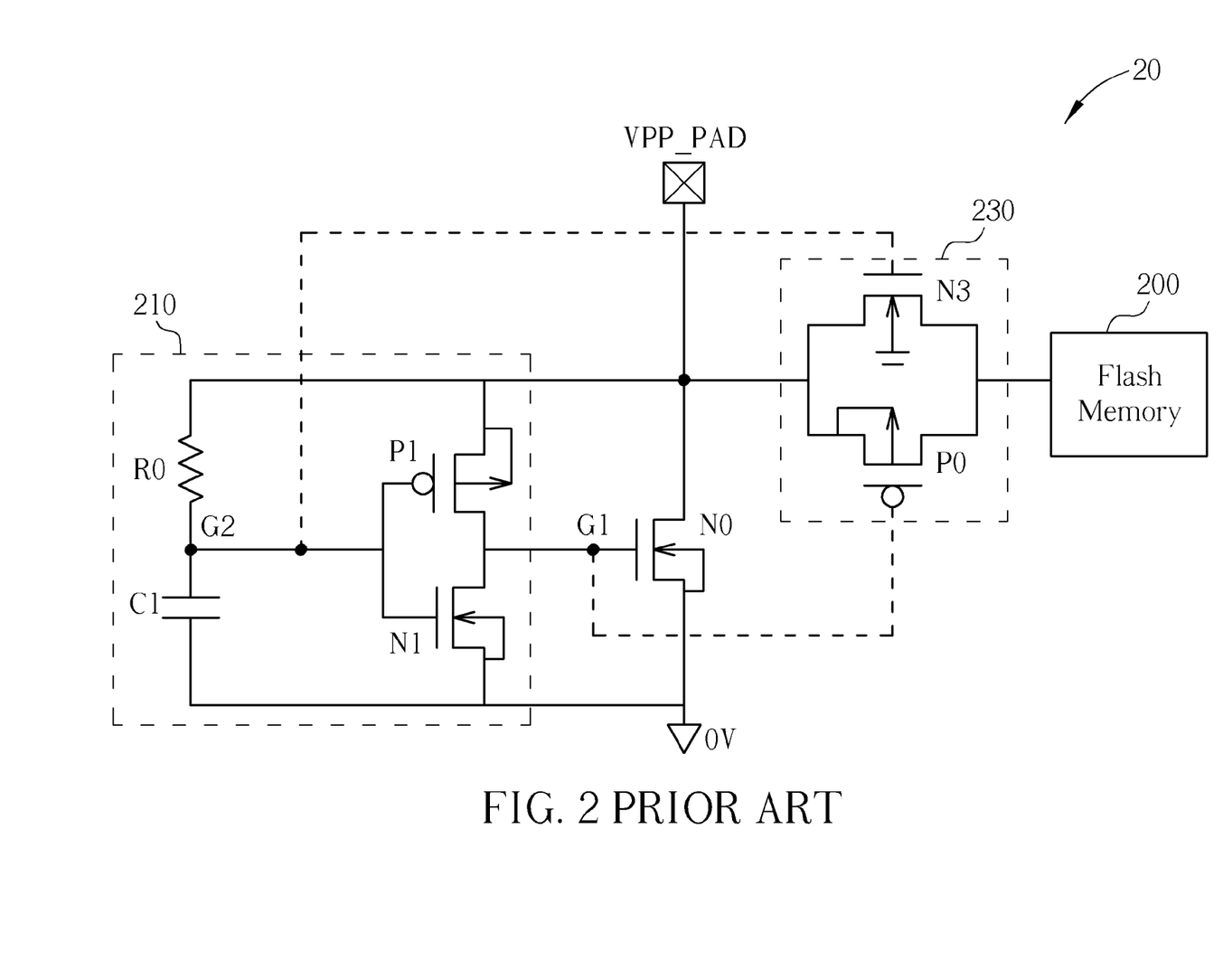
FIG. 2 is a diagram of a flash memory circuit according to the prior art.

Please refer to FIG. 2, which is a diagram of a flash memory circuit 20 according to the prior art. The flash memory circuit 20 includes a plurality of flash memory blocks 200 that are programmable through a programming voltage VPP applied at a pad VPP_PAD. A gate driven circuit 210 drives a gate electrode of a pass gate 230 to allow the programming voltage VPP to be sent to the flash memory blocks 200. The pass gate 230 comprises an N-type metal-oxide semiconductor (NMOS) transistor N3 and a P-type metal-oxide-semiconductor (PMOS) transistor P0. A gate electrode of the NMOS transistor N3 is electrically connected to a node G2; a gate electrode of the PMOS transistor P0 is electrically connected to a node G1. When the programming voltage VPP is applied at the pad VPP_PAD, voltage at the node G2 increases to approximately the programming voltage VPP, and voltage at the node G1 is pulled down by an NMOS transistor N1, which is turned on. Thus, the pass gate 230 turns on, and the programming voltage VPP may be sent to the flash memory blocks 200. If no voltage is applied at the pad VPP_PAD, e.g. the pad VPP_PAD is grounded, voltage at the node G2 decreases to approximately ground, turning off the NMOS transistor N1, and thereby turning off the pass gate 230, effectively cutting off voltage applied to the pad VPP_PAD from the flash memory blocks 200. Programming may occur when the programming voltage VPP is high, or when the programming voltage VPP is low, e.g. 0V. In other words, the programming voltage VPP may operate as a high voltage or a low voltage.

Electrostatic discharge (ESD) entering the flash memory circuit 20 through the pad VPP_PAD is one potential source of damage to the flash memory blocks 200. To mitigate the ESD effect, one goal is to direct excess charges to a lower potential node, such as ground. The flash memory circuit 20 thus further comprises an ESD transistor N0 for redirecting ESD current away from the flash memory blocks 200. When the voltage applied to the pad VPP_PAD goes high, a gate electrode of the ESD transistor N0 is temporarily pulled high at the node G1 through the PMOS transistor P1, because a capacitor C1 and a resistor R0 keep gates of the NMOS transistor N1 and the PMOS transistor P1 low while the capacitor C1 is charged by the ESD charges. ESD zapping typically occurs for a period on the order of nanoseconds. Thus, the resistor R0 and the capacitor C1 may be designed with a RC time constant of approximately 1 us to keep the ESD transistor N0 turned on long enough to redirect most or all of the ESD current.

One problem that may occur in either of the circuits described above is accidental programming of one of the flash memory blocks during the ESD zapping event.

SUMMARY OF THE INVENTION

According to an embodiment of the present invention, an electrostatic discharge (ESD) protection circuit electrically connected to a core circuit for preventing ESD charges from reaching the core circuit. The ESD protection circuit comprises a pad, a pass transistor, a transistor, a capacitor, a resistor, and a delay trigger unit. The pass transistor has a first electrode electrically connected to the pad, a second electrode electrically connected to the core circuit, and a control electrode electrically connected to a first node. The transistor has a first electrode electrically connected to the pad, a second electrode electrically connected to a low power supply, and a control electrode electrically connected to a second node. The capacitor has a first electrode electrically connected to the pad, and a second electrode electrically connected to the control electrode of the transistor. The resistor has a first electrode electrically connected to the control electrode of the transistor, and a second electrode electrically connected to the low power supply. The delay trigger unit has an input terminal electrically connected to the second node, and an output terminal electrically connected to the first node.

According to another embodiment of the present invention, an electrostatic discharge (ESD) protection circuit is electrically connected to a core circuit for preventing ESD charges from reaching the core circuit. The ESD protection circuit comprises a pad, a pass transistor, a transistor, an inverter, a capacitor, a resistor, and a delay trigger unit. The pass transistor has a first electrode electrically connected to the pad, a second electrode electrically connected to the core circuit, and a control electrode electrically connected to a first node. The transistor has a first electrode electrically connected to the pad, a second electrode electrically connected to a low power supply, and a control electrode electrically connected to a second node. The inverter has an input terminal electrically connected to a third node, and an output terminal electrically connected to the second node. The resistor has a first electrode electrically connected to the pad, and a second electrode electrically connected to the third node. The capacitor has a first electrode electrically connected to the input terminal of the inverter, and a second electrode electrically connected to the low power supply. The delay trigger unit has an input terminal electrically connected to the second node, and an output terminal electrically connected to the first node.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
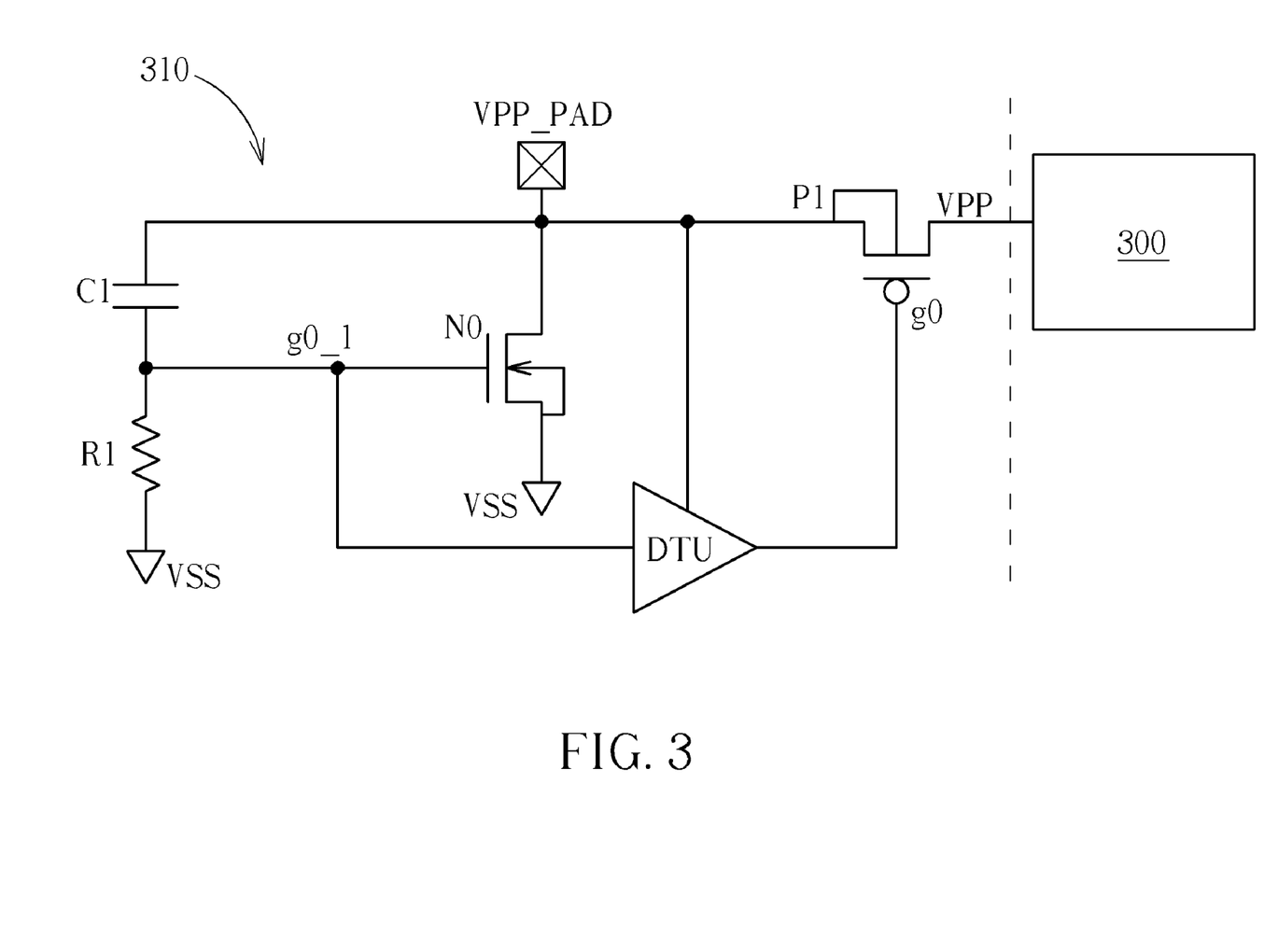
FIG. 3 is a diagram of an ESD protection circuit according to an embodiment of the present invention.

Please refer to FIG. 3, which is a diagram of an ESD protection circuit 310 according to an embodiment. The core circuit 300 receives a pad voltage VPP from a pad VPP_PAD, and is protected by an NMOS transistor N0 and a pass transistor P1. The pass transistor P1 may be a PMOS transistor. A gate electrode of the NMOS transistor N0 may be electrically connected to a resistor R1 and a capacitor C1. The capacitor C1 may have a first electrode electrically connected to the pad VPP_PAD and a second electrode electrically connected to the gate electrode of the NMOS transistor N0. The NMOS transistor N0 comprises a drain electrode electrically connected to the pad VPP_PAD, a source electrode electrically connected to the power supply VSS, and a gate electrode electrically connected to the second electrode of the capacitor C1. The gate electrode of the NMOS transistor N0 controls conduction of current from the drain electrode of the NMOS transistor N0 to the source electrode of the NMOS transistor N0 according to voltage at node g0_1. The pass transistor P1 comprises a first electrode coupled to the core circuit 300, a second electrode coupled to the pad VPP_PAD, and a control electrode at node g0. The control electrode of the pass transistor P1 controls conduction of current from the first electrode of the pass transistor P1 to the second electrode of the pass transistor P1 according to voltage at the node g0. The first electrode of the pass transistor P1 may be a drain electrode, and the second electrode of the pass transistor P1 may be a source electrode. A delay trigger unit DTU has an input terminal electrically connected to the node g0_1, an output terminal electrically connected to the node g0, and a power terminal electrically connected to the pad VPP_PAD. The delay trigger unit DTU may transmit high signals faster than low signals, or vice versa. For the ESD protection circuit 310 shown in FIG. 3, the delay trigger unit DTU transmits high signals faster than low signals. Said another way, the delay trigger unit DTU delays high signals less than low signals.

Figure 4:
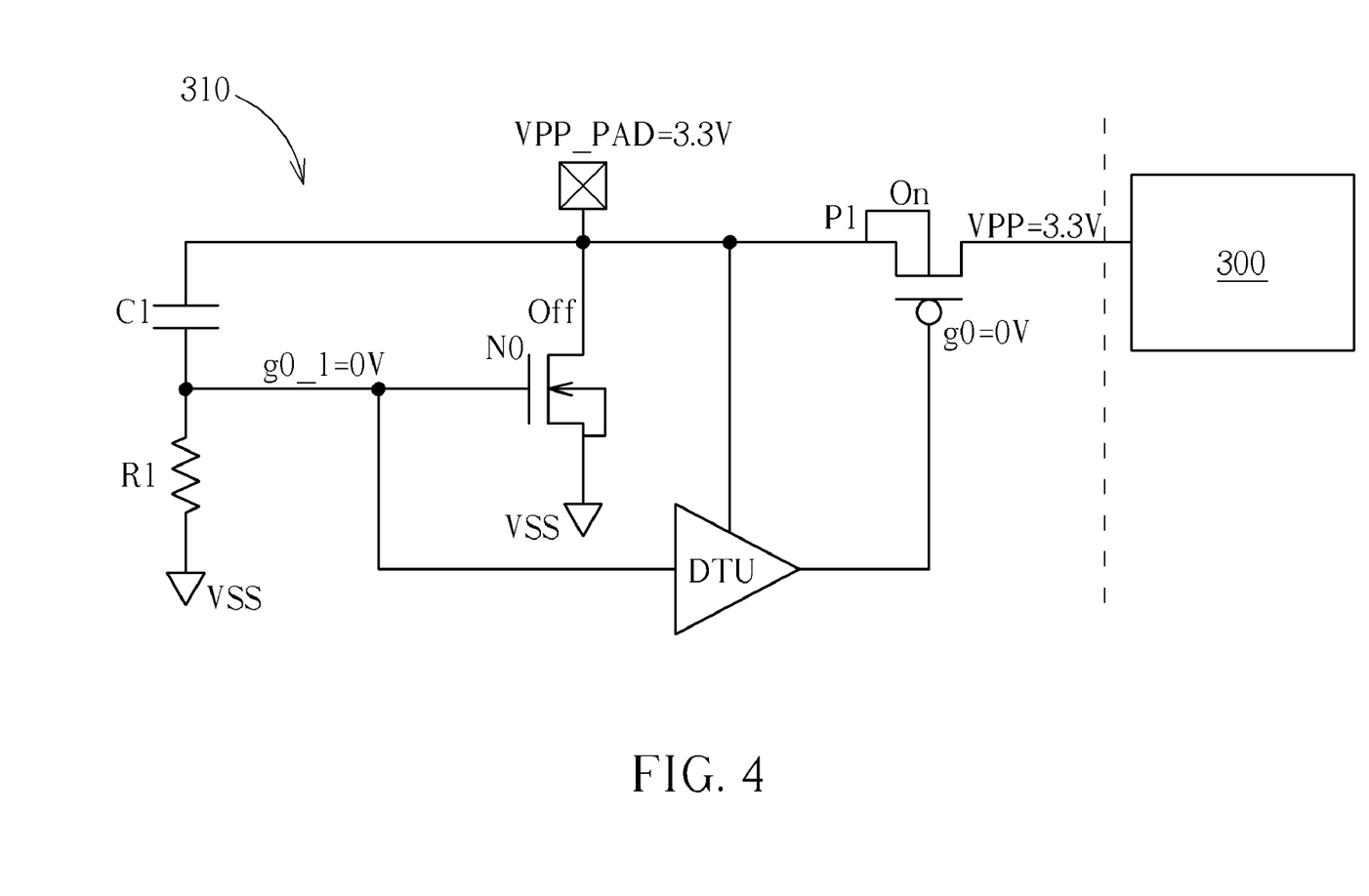
FIG. 4 is a diagram of the ESD protection circuit of FIG. 3 in read mode.

Please refer to FIG. 4, which is a diagram of the ESD protection circuit 310 of FIG. 3 in read mode. In a read cycle, read voltage VPP of the pad VPP_PAD may be 3.3 Volts, voltage at the node g0_1 may be 0 Volts, and voltage at the node g0 may be 0 Volts. Thus, when the read voltage VPP is applied to the pad VPP_PAD, the pass transistor P1 is turned on, and the read voltage VPP may be applied to the core circuit 300 for reading data from the core circuit 300. Voltage at the node g0_1 keeps the NMOS transistor N0 off, so as to prevent leakage of current from the pad VPP_PAD.

Figure 5:
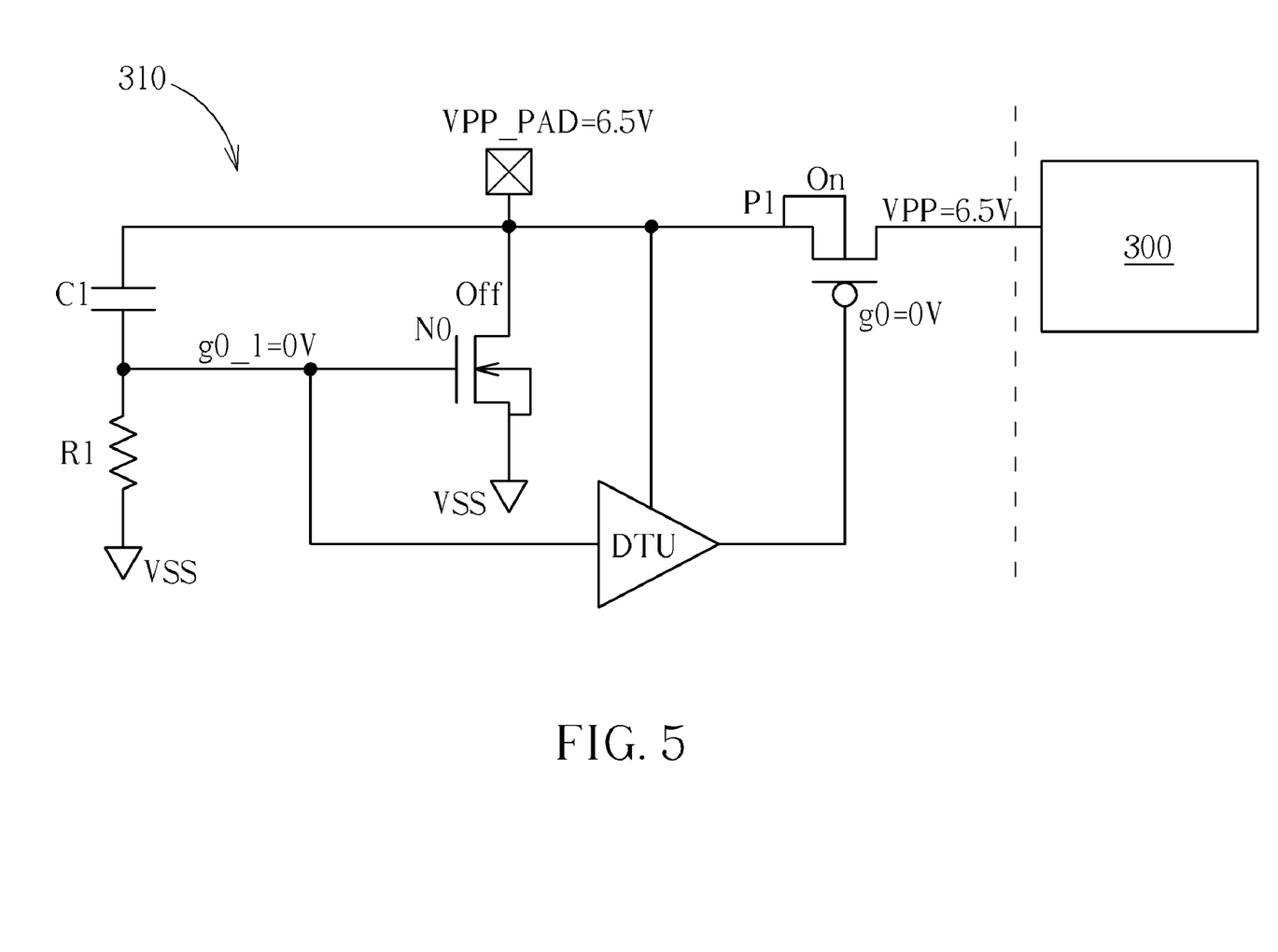
FIG. 5 is a diagram of the ESD protection circuit of FIG. 3 in programming mode.

Please refer to FIG. 5, which is a diagram of the ESD protection circuit 310 of FIG. 3 in programming mode. In a program cycle, programming voltage VPP of the pad VPP_PAD may be 6.5 Volts, voltage at the node g0_1 may be 0 Volts, and voltage at the node g0 may be 0 Volts. Thus, when the programming voltage VPP is applied to the pad VPP_PAD, the pass transistor P1 is turned on, and the programming voltage VPP may be applied to the core circuit 300 for programming the core circuit 300. Voltage at the node g0_1 keeps the NMOS transistor N0 off, so as to prevent leakage of current from the pad VPP_PAD.

Figure 6:
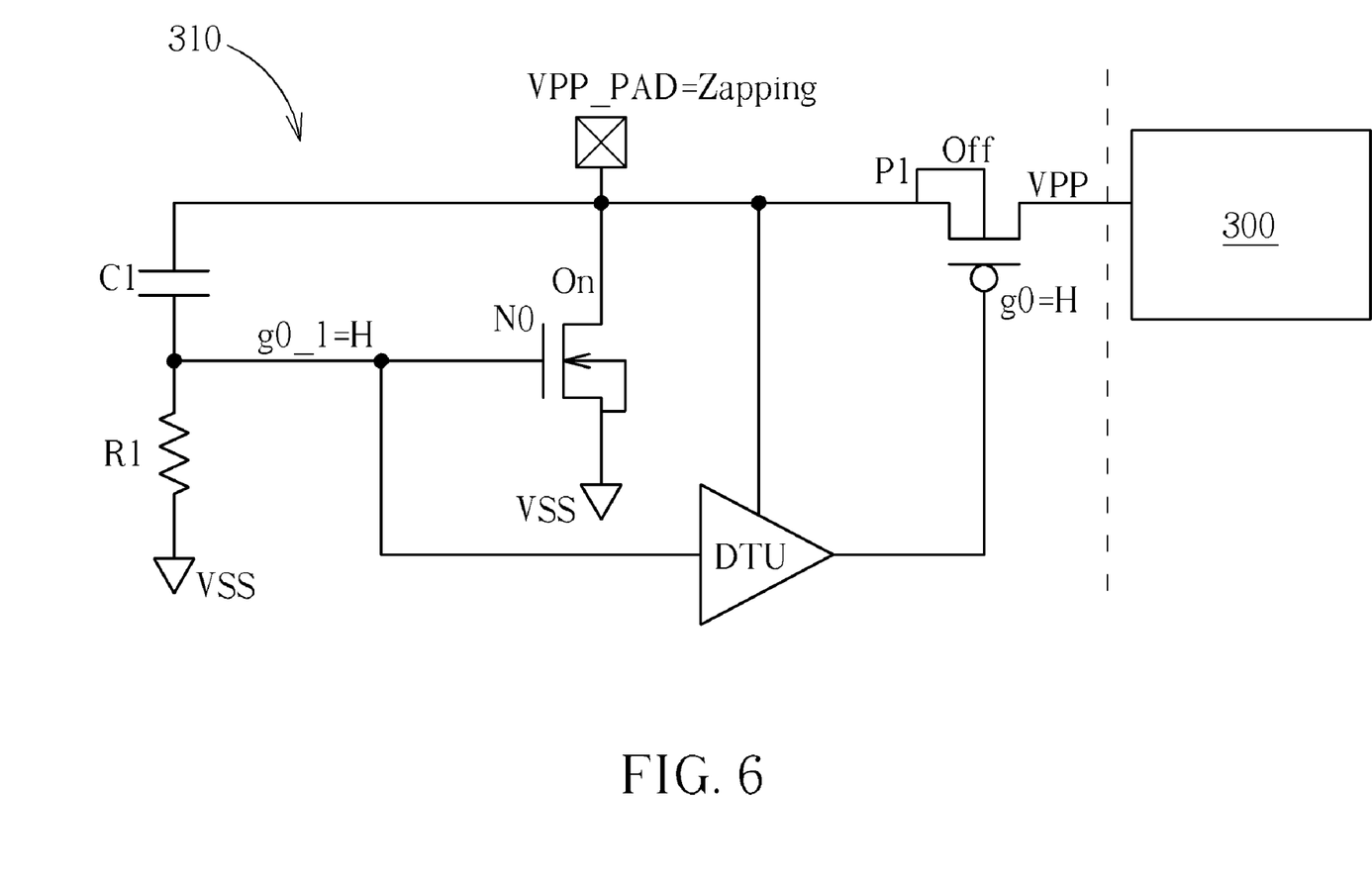
FIG. 6 is a diagram of the ESD protection circuit of FIG. 3 in an ESD event.

Please refer to FIG. 6, which is a diagram of the ESD protection circuit 310 of FIG. 3 in an ESD event. At the beginning of an ESD zapping event, ESD charges enter the ESD protection circuit 310 through the pad VPP_PAD. A rapid increase in voltage at the pad VPP_PAD pulls voltage at the node g0_1 high due to the capacitor C1. High voltage at the node g0_1 turns on the NMOS transistor N0, thereby sinking ESD charges to the low power supply VSS. The delay trigger unit DTU transmits high signals faster than low signals, so voltage at the node g0 is pulled high quickly in response to the high voltage at the node g0_1. High voltage at the node g0 turns off the pass transistor P1, preventing the ESD charges from entering the core circuit 300. As the ESD charges are sunk to the low power supply VSS through the NMOS transistor N0, voltage at the node g0_1 decreases. The delay trigger unit DTU transitions to a low voltage slower than to a high voltage, allowing the high voltage at the node g0 to keep the pass transistor P1 off longer. Thus, instead of the pass transistor P1 receiving the voltage at the node g0_1 directly, in the ESD protection circuit 310, the pass transistor P1 receives the voltage at the node g0_1 through the delay trigger unit DTU. This ensures that the pass transistor P1 does not turn on accidentally while ESD charges are still present at the pad VPP_PAD.

Figure 7:
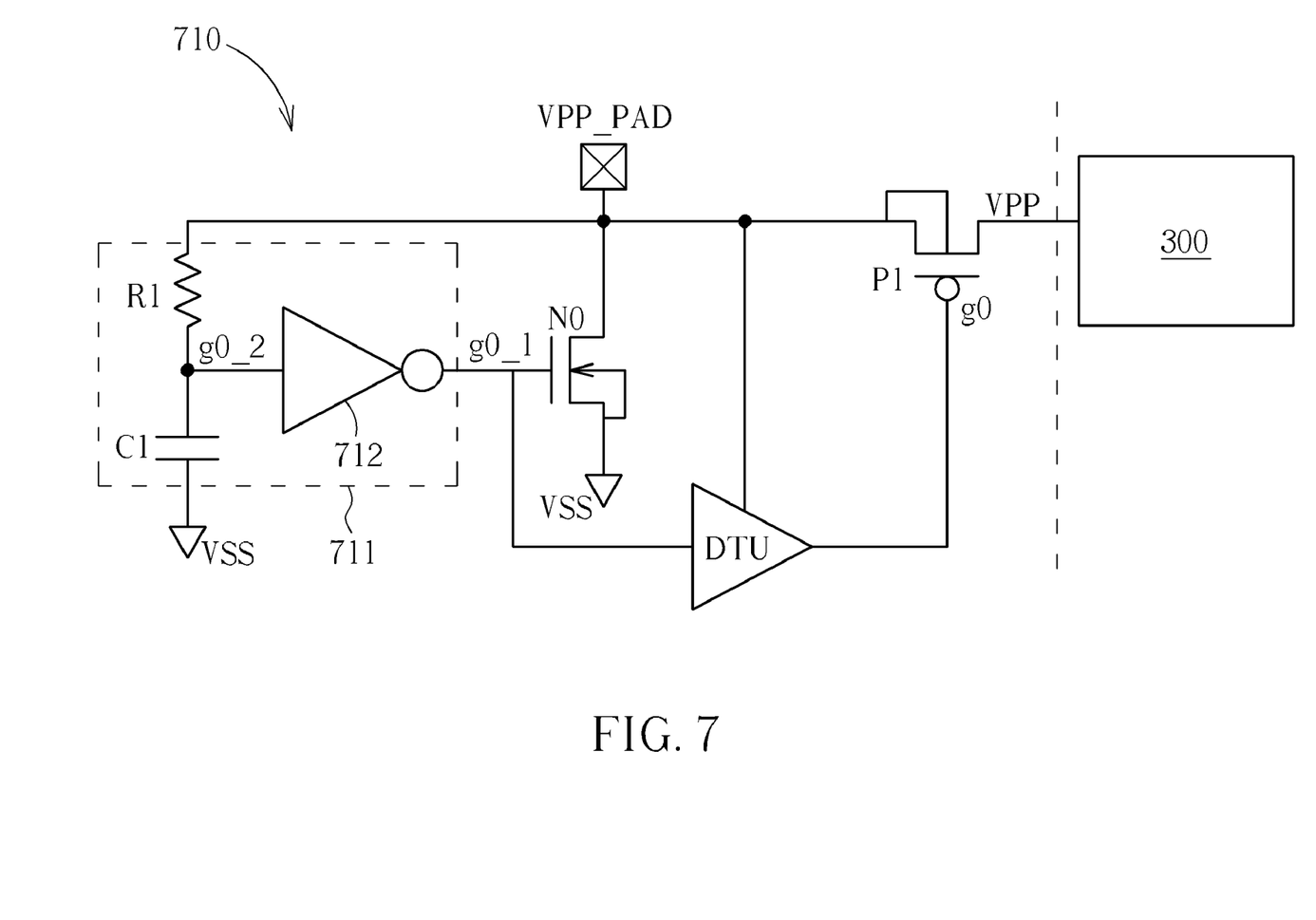
FIG. 7 is a diagram of an ESD protection circuit according to another embodiment of the present invention.

Please refer to FIG. 7, which is a diagram of an ESD protection circuit 710 according to another embodiment of the present invention. The core circuit 300 receives a pad voltage VPP from a pad VPP_PAD, and is protected by the ESD protection circuit 710, which comprises a gate driven circuit 711, an NMOS transistor N0, and a pass transistor P1. The gate driven circuit 711 comprises an inverter circuit 712, a resistor R1, and a capacitor C1, such as a MOS capacitor. The inverter 712 comprises an input terminal at a node g0_2, and an output terminal at a node g0_1. The inverter circuit 712 causes voltage at the node g0_1 to be the inverse of voltage at the node g0_2. For example, if voltage at the node g0_2 is high, voltage at the node g0_1 may be low, or vice versa. Voltage at the node g0_1 may be considered output voltage of the inverter 712; voltage at the node g0_2 may be considered input voltage of the inverter 712. A first electrode of the resistor R1 is electrically connected to the pad VPP_PAD for receiving the pad voltage VPP. A second electrode of the resistor R1 is electrically connected to the node g0_2. The capacitor C1 is for delaying a change in voltage at the node g0_2. A first electrode of the capacitor C1 is coupled to the input terminal of the inverter circuit 712 at the node g0_2. A second electrode of the capacitor C1 may be coupled to a power supply VSS, which may be a low voltage supply, or a ground. The NMOS transistor N0 comprises a first electrode coupled to the pad VPP_PAD, a second electrode coupled to the power supply VSS, and a control electrode coupled to the output terminal of the inverter circuit at the node g0_1 for receiving voltage at the node g0_1. The control electrode of the NMOS transistor N0 controls conduction of current from the first electrode of the NMOS transistor N0 to the second electrode of the NMOS transistor N0 according to the voltage at the node g0_1. The first electrode of the NMOS transistor N0 may be a drain electrode, and the second electrode of the NMOS transistor N0 may be a source electrode. The PMOS transistor P1 comprises a first electrode coupled to one of the flash memory blocks 300, a second electrode coupled to the pad VPP_PAD, and a control electrode electrically connected to a node g0. The control electrode of the PMOS transistor P1 controls conduction of current from the first electrode of the PMOS transistor P1 to the second electrode of the PMOS transistor P1 according to voltage at the node g0. The first electrode of the PMOS transistor P1 may be a drain electrode, and the second electrode of the PMOS transistor P1 may be a source electrode. A delay trigger unit DTU is coupled from the node g0_1 to the node g0 for delaying a transition in voltage at the node g0 while voltage at the node g0_1 decreases during an ESD zapping event.

Figure 8:
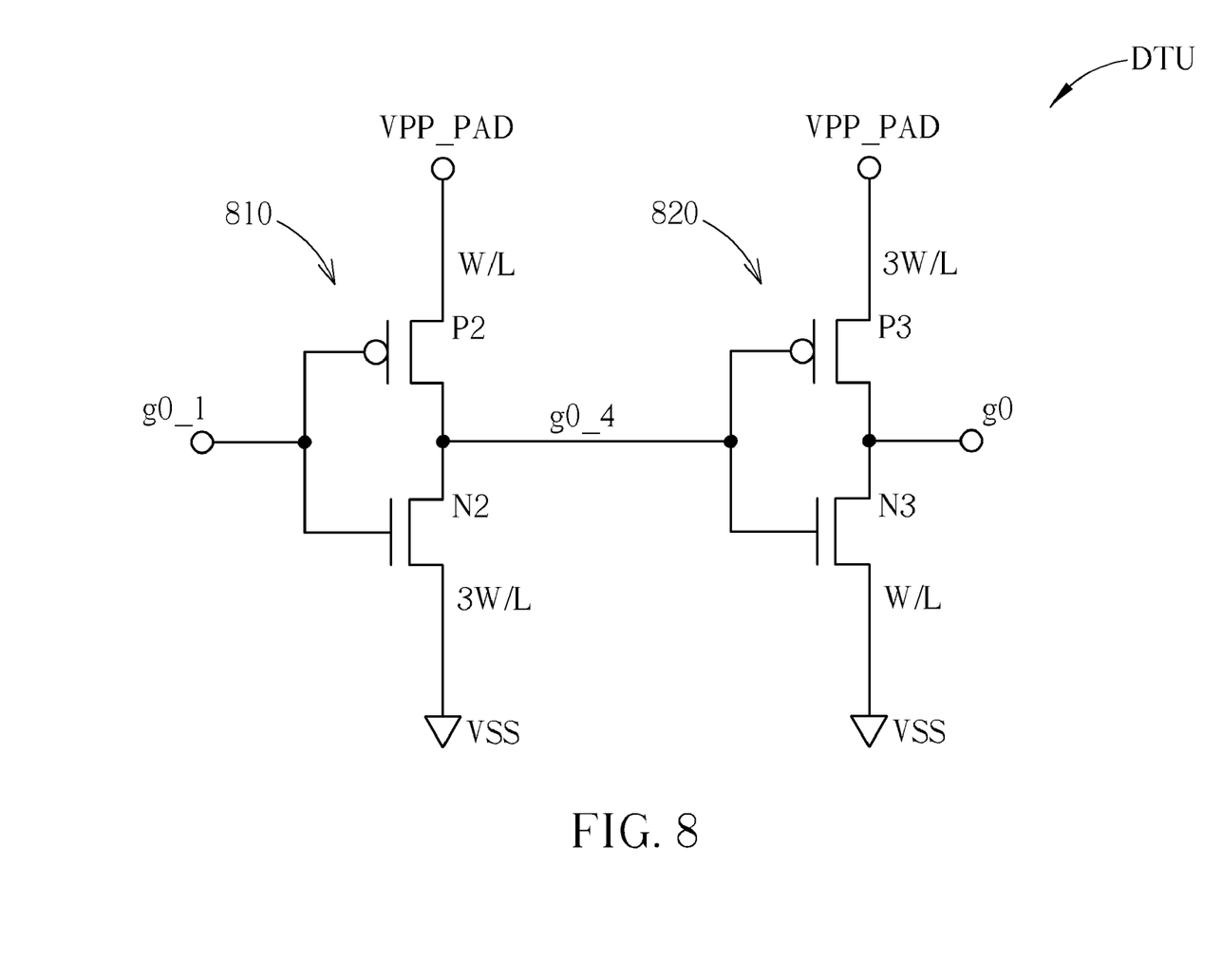
FIG. 8 is a detailed circuit diagram of a delay trigger unit according to one embodiment.

Please refer to FIG. 8, which is a detailed circuit diagram of the delay trigger unit DTU according to one embodiment. To realize the functions described above for the delay trigger unit DTU, two inverter circuits 810 and 820 are connected in series. The inverter circuit 810 comprises a PMOS transistor P2 having a first electrode electrically connected to a node g0_4, a second electrode electrically connected to the pad VPP_PAD, and a control electrode electrically connected to the node g0_1. The inverter circuit 810 further comprises an NMOS transistor N2 having a first electrode electrically connected to the node g0_4, a second electrode electrically connected to the low power supply VSS, and a control electrode electrically connected to the node g0_1. The inverter circuit 820 comprises a PMOS transistor P3 having a first electrode electrically connected to the node g0, a second electrode electrically connected to the pad VPP_PAD, and a control electrode electrically connected to the node g0_4. The inverter circuit 820 further comprises an NMOS transistor N3 having a first electrode electrically connected to the node g0, a second electrode electrically connected to the low power supply VSS, and a control electrode electrically connected to the node g0_4.

To delay high signals less than low signals, the NMOS and PMOS transistors N2, N3, P2, P3 of the delay trigger unit DTU may be configured with different gate-aspect ratios. As shown in FIG. 8, the PMOS transistor P2 may have a gate-aspect ratio of W/L, the NMOS transistor N2 may have a gate-aspect ratio of 3W/L, the PMOS transistor P3 may have a gate-aspect ratio of 3W/L, and the NMOS transistor N3 may have a gate-aspect ratio of W/L. Thus, current sinking ability of the NMOS transistor N2 is greater than current sourcing ability of the PMOS transistor P2; and, current sourcing ability of the PMOS transistor P3 is greater than current sinking ability of the NMOS transistor N3. So, when a high voltage is applied to the node g0_1, voltage at the node g0_4 is sunk rapidly, and voltage at the node g0 is sourced rapidly. However, when a low voltage is applied to the node g0_1, voltage at the node g0_4 is sunk slowly, and voltage at the node g0 is sourced slowly. Please note that a size ratio of 3:1 of the NMOS transistor N2 to the PMOS transistor P2, and of the PMOS transistor P3 to the NMOS transistor N3, is intended for illustrative purposes only, and that any size ratio greater than 1:1 could be used to achieve the purpose of delaying low signals. Likewise, the delay trigger unit DTU may easily be altered to delay high signals by inverting the size ratios just mentioned, e.g. a size ratio of 1:3 of the NMOS transistor N2 to the PMOS transistor P2 and of the PMOS transistor P3 to the NMOS transistor N3 would provide delay of high signals.

Inclusion of the delay trigger unit DTU improves performance of the ESD protection circuits described above by ensuring that the pass transistor P1 does not turn on accidentally while ESD charges are still present at the pad VPP_PAD, which may lead to accidental programming of the core circuit 300. Instead, the delay trigger unit DTU retards low voltages from reaching the pass transistor P1, thereby keeping the pass transistor P1 off longer during an ESD zapping event.

Those skilled in the art will readily observe that numerous modifications and alterations of the device and method may be made while retaining the teachings of the invention.

What is claimed is:

1. An electrostatic discharge (ESD) protection circuit electrically connected to a core circuit for preventing ESD charges from reaching the core circuit, the ESD protection circuit comprising:
   a pad;
   a pass transistor having a first electrode electrically connected to the pad, a second electrode electrically connected to the core circuit, and a control electrode electrically connected to a first node;
   a transistor having a first electrode electrically connected to the pad, a second electrode electrically connected to a low power supply, and a control electrode electrically connected to a second node;
   a capacitor having a first electrode electrically connected to the pad, and a second electrode electrically connected to the control electrode of the transistor;
   a resistor having a first electrode electrically connected to the control electrode of the transistor, and a second electrode electrically connected to the low power supply; and
   a delay trigger unit having an input terminal electrically connected to the second node, and an output terminal electrically connected to the first node.

2. The ESD protection circuit of claim 1, wherein the delay trigger unit comprises:
   a first transistor having a first electrode electrically connected to a third node, a second electrode electrically connected to the pad, and a control electrode electrically connected to the second node;
   a second transistor having a first electrode electrically connected to the third node, a second electrode electrically connected to the low power supply, and a control electrode electrically connected to the second node;
   a third transistor having a first electrode electrically connected to the first node, a second electrode electrically connected to the pad, and a control electrode electrically connected to the third node; and
   a fourth transistor having a first electrode electrically connected to the first node, a second electrode electrically connected to a low power supply, and a control electrode electrically connected to the third node.

3. The ESD protection circuit of claim 2, wherein size of the second transistor is greater than size of the first transistor.

4. The ESD protection circuit of claim 3, wherein size of the third transistor is greater than size of the fourth transistor.

5. The ESD protection circuit of claim 2, wherein size of the third transistor is greater than size of the fourth transistor.

6. An electrostatic discharge (ESD) protection circuit electrically connected to a core circuit for preventing ESD charges from reaching the core circuit, the ESD protection circuit comprising:
   a pad;
   a pass transistor having a first electrode electrically connected to the pad, a second electrode electrically connected to the core circuit, and a control electrode electrically connected to a first node;
   a transistor having a first electrode electrically connected to the pad, a second electrode electrically connected to a low power supply, and a control electrode electrically connected to a second node;

an inverter having an input terminal electrically connected to a third node, and an output terminal electrically connected to the second node;

a resistor having a first electrode electrically connected to the pad, and a second electrode electrically connected to the third node;

a capacitor having a first electrode electrically connected to the input terminal of the inverter, and a second electrode electrically connected to the low power supply; and a delay trigger unit having an input terminal electrically connected to the second node, and an output terminal electrically connected to the first node.

7. The ESD protection circuit of claim 6, wherein the delay trigger unit comprises:

a first transistor having a first electrode electrically connected to a fourth node, a second electrode electrically connected to the pad, and a control electrode electrically connected to the second node;

a second transistor having a first electrode electrically connected to the fourth node, a second electrode electrically connected to the low power supply, and a control electrode electrically connected to the second node;

a third transistor having a first electrode electrically connected to the first node, a second electrode electrically connected to the pad, and a control electrode electrically connected to the fourth node; and a fourth transistor having a first electrode electrically connected to the first node, a second electrode electrically connected to a low power supply, and a control electrode electrically connected to the fourth node.

8. The ESD protection circuit of claim 7, wherein size of the second transistor is greater than size of the first transistor.

9. The ESD protection circuit of claim 8, wherein size of the third transistor is greater than size of the fourth transistor.

10. The ESD protection circuit of claim 7, wherein size of the third transistor is greater than size of the fourth transistor.

* * * * *